(12) United States Patent
Daly

(10) Patent No.: US 9,039,033 B2
(45) Date of Patent: May 26, 2015

(54) CHAIR TO ASSIST PHYSICALLY CHALLENGED PERSONS IN SWIMMING

(71) Applicant: Richard F. Daly, Charlestown, MA (US)

(72) Inventor: Richard F. Daly, Charlestown, MA (US)

( * ) Notice: Subject to any disclaimer, the term of this patent is extended or adjusted under 35 U.S.C. 154(b) by 0 days.

(21) Appl. No.: 14/286,370

(22) Filed: May 23, 2014

(65) Prior Publication Data

US 2014/0265257 A1    Sep. 18, 2014

Related U.S. Application Data

(63) Continuation of application No. 13/928,017, filed on Jun. 26, 2013, now Pat. No. 8,764,047.

(60) Provisional application No. 61/666,879, filed on Jul. 1, 2012.

(51) Int. Cl.
| | |
|---|---|
| *B62B 1/00* | (2006.01) |
| *A47C 1/14* | (2006.01) |
| *B62B 7/02* | (2006.01) |
| *A61G 5/10* | (2006.01) |
| *A47C 1/026* | (2006.01) |
| *A47C 7/00* | (2006.01) |
| *A47C 15/00* | (2006.01) |

(Continued)

(52) U.S. Cl.
CPC ... *A47C 1/14* (2013.01); *B62B 7/02* (2013.01); *A61G 5/10* (2013.01); *B62B 2202/42* (2013.01); *B62B 2202/52* (2013.01); *A47C 1/026* (2013.01); *A47C 7/006* (2013.01); *A47C 15/006* (2013.01); *A61G 5/00* (2013.01); *A61G 5/006* (2013.01); *A61G 5/08* (2013.01); *A61G 5/1067* (2013.01); *A61G 2005/1083* (2013.01)

(58) Field of Classification Search
USPC ............ 280/655, 650; 297/118, 129, DIG. 4; 440/26, 90, 98, 100; 114/270
See application file for complete search history.

(56) References Cited

U.S. PATENT DOCUMENTS 3,769,647 A    11/1973 Basa
4,662,852 A    5/1987 Schneider et al.

(Continued)

FOREIGN PATENT DOCUMENTS

EP    0107847 A1    10/1983
WO    WO2007/107799 A1    9/2007

OTHER PUBLICATIONS

Floating wheelchairs open up the beaches, Saratoga Herald Tribune, (Oct. 29, 2010).

(Continued)

*Primary Examiner* — John Walters
*Assistant Examiner* — James Triggs
(74) *Attorney, Agent, or Firm* — Antoinette G. Giugliano; AGG Intellectual Property Law

(57) ABSTRACT

The present invention relates to a swim chair that allows a mobility challenged individual to be transported across the sand with exceptional ease, to lounge on the chair and enjoy the company and sights, to be pulled into the water and, if able, to slip off the chair to go for a swim, remount the chair and return to shore.

The chair includes a main frame, defined by a top frame member and two side frame members; two axle support plates, at or in communication with the side frame members of the main frame, the axle support plates having a plurality of openings to receive a wheel axle and optionally a pull rod axle; a wheel assembly; a drop seat; a footrest and a backrest.

20 Claims, 11 Drawing Sheets

(51) Int. Cl.
*A61G 5/00* (2006.01)
*A61G 5/08* (2006.01)

(56) References Cited

U.S. PATENT DOCUMENTS

| | | | |
|---|---|---|---|
| 4,688,557 A * | 8/1987 | Bradstreet | 606/241 |
| D302,959 S | 8/1989 | Turlington, Jr. | |
| 4,926,777 A | 5/1990 | Davis, Jr. | |
| 5,020,818 A | 6/1991 | Oxford | |
| 5,149,118 A * | 9/1992 | Oxford | 280/250.1 |
| D329,995 S | 10/1992 | Turnlington, Jr. | |
| 5,291,846 A | 3/1994 | Davis, Jr. | |
| 5,507,513 A | 4/1996 | Peters et al. | |
| 5,634,650 A | 6/1997 | Hensler et al. | |
| 5,782,480 A | 7/1998 | Phillips | |
| 6,312,054 B1 | 11/2001 | Scheurer | |
| 6,783,181 B2 | 8/2004 | Scheurer | |
| 7,195,316 B2 | 3/2007 | Shimasaki et al. | |
| 2003/0218310 A1 | 11/2003 | Volk et al. | |
| 2011/0285182 A1 | 11/2011 | Wilson | |
| 2013/0038096 A1 | 2/2013 | Newsome | |

OTHER PUBLICATIONS

Beach wheelchairs get a big boost, Cape Cod Times, p. 3, (Apr. 6, 2012).

* cited by examiner

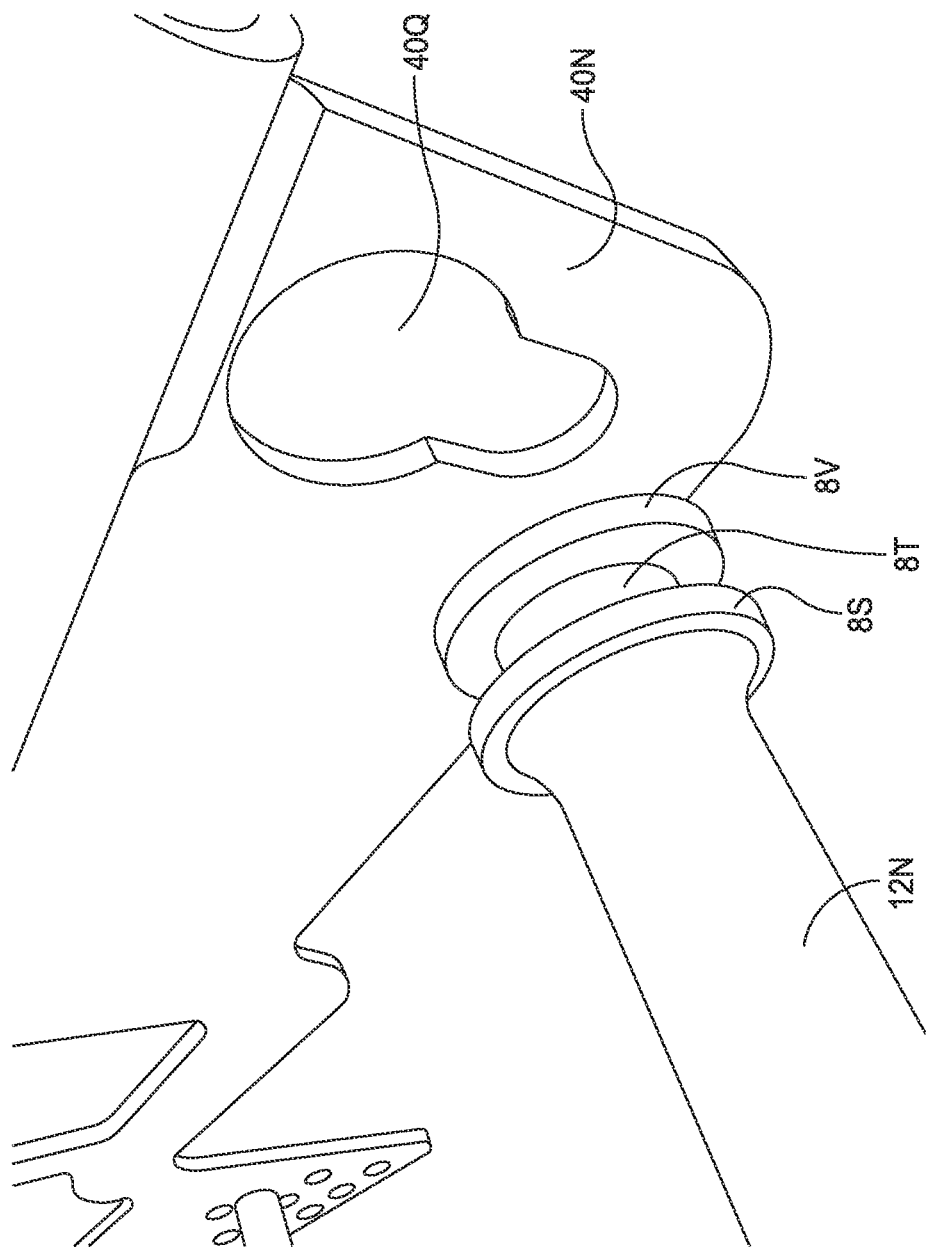

CHAIR TO ASSIST PHYSICALLY CHALLENGED PERSONS IN SWIMMING

RELATED APPLICATION

This application is a continuation of U.S. application Ser. No. 13/928,017, filed Jun. 26, 2013, entitled "A Chair to Assist Physically Challenged Persons in Swimming" by Richard F. Daly; which claims the benefit of U.S. Provisional Application No. 61/666,879, filed Jul. 1, 2012, entitled "A Chair to Assist Physically Challenged Persons in Swimming" by Richard F. Daly.

The entire teachings of the above applications are incorporated herein by reference.

BACKGROUND OF THE INVENTION

For physically challenged persons, the beach can be difficult to enjoy for several reasons. The sand is uneven and soft, making the use of wheel chairs very difficult. Additionally, although physically challenged persons may not have use of their legs, they are often able to swim. However, getting close to the water at a beach can be difficult because of the uneven, sloping landscape and stones and shells in the sand.

Accordingly, a need exists for a chair that allows one to easily wheel a person onto the beach having uneven sand and a sloping landscape. A further need exists for a chair that allows one to pull a person into the water and allows the chair to remain stable when floating in the water. Yet, a further need exists for a chair that allows for both uses.

SUMMARY OF THE INVENTION

The present invention relates to a chair to assist a physically challenged individual in swimming. The chair includes a main frame, defined by a top frame member, a bottom frame member, and two side frame members; two axle support plates, at or in communication with the side frame members of the main frame, the axle support plates having a plurality of openings to receive a wheel axle and a pull rod axle; and a wheel assembly. In some embodiments, the main frame of the chair is defined by a top frame and two side frame members. The wheel assembly includes two or more tires, wherein the tires are flotation devices; and the wheel axle that connects the two or more tires. In an embodiment, the chair further includes a pull rod that is defined by the pull rod axle; two side members; and a handle. The pull rod is optional. The chair can also include a drop seat, defined by a drop seat frame, and one or more cross bars, and one or more drop seat support members to support the individual while sitting. One of the cross bars can be pivotally connected the main frame. The drop seat, when in use, can be pivoted to a swim position or a lounge position. The chair of the present invention also includes a backrest frame including a plurality of backrest support members to define a backrest, wherein the backrest frame connects to the main frame. In an aspect, the footrest is defined by a frame, a footrest support, one or more legs, detachably connected to the base frame member. The footrest functions, in certain embodiments, as a transfer station to allow the user to transfer to and from a wheel chair. Also embodied are chairs with a footrest shaped to facilitate loading the chair in and out of the car, and moving it across sand e.g., one that is curved on one side (e.g., inwardly curved on the side closer to the middle of the chair). The drop seat and the backrest can be detachably connected when moved between the swim position and the lounge position. In an embodiment, when the drop seat is in the swim position, the drop seat rests on the wheel axle or support rod, and when the drop seat is in the lounge position, the drop seat is essentially coplanar with the main frame. In embodiment, the drop seat and the backrest are detachably connected by a mechanism that comprises a connecting roll and a hoist attached to the backrest; and a hinged bail attached to the main frame. The pull rod handle can extend past the main frame by about 1 and about 6 inches. The pull rod, in an embodiment, is optional. In yet another embodiment, the footrest legs have a height that is the same as the height of a wheelchair seat. The diameter of the tires, when mounted, for example, ranges between about 12 inches to about 24 inches, and the pressure of the tires, e.g., ranges between about 1 lb/in$^2$ to about 5 lb/in$^2$. The chair, in an aspect, can be used by a person having a weight ranging between about 40 lbs to about 350 lbs.

The present invention also pertains to a chair to assist a physically challenged individual in swimming, that includes a main frame, defined by a top frame member, a bottom frame member, and two side frame members; two axle support plates, at or in communication with the side frame members of the main frame, the axle support plates having a plurality of openings to receive a wheel axle; a wheel assembly, as described herein, a drop seat, defined by a drop seat frame, and one or more cross bars, and one or more drop seat support members to support the individual while sitting, one of the cross bars is pivotally connected to the main frame; wherein the drop seat, when in use, can be in a swim position or a lounge position; and a backrest frame comprising a plurality of backrest support members to define a backrest, wherein the backrest frame connects to the main frame.

In an embodiment, the chair has a drop seat that is connected to the main frame with one or more drop seat support members. A drop seat support member, in an embodiment, is connected to the chair at a level that is below the height of the main frame. From this lower level, the side members of the drop seat frame can curve up to a height that is the same or about the same to that of the main frame, and then curve down. To removably attach the support member to the main frame, some embodiments have a key-hole frame as a part of the chair. The key-hole frame can have one or more openings (e.g., with two openings, a larger one would initially receive the support member, while the second smaller one would stabilize the support member). The support member can have a recess sandwiched between two protruding rings on each of its sides. The recess (e.g., a slot) can be received by an opening of the key-hole frame.

The present invention further embodies methods of using the chair described herein. The steps of the method so that the chair can be used in the water include engaging the drop seat to position the drop seat in the swim position; pulling the chair into the water with an individual seated in the chair; and allowing an individual to swim to or from the chair. The steps of the method so that the chair can be used outside the water include engaging the drop seat to position the drop seat in the lounge position; and allowing an individual to lounge in the chair or allowing the individual to transfer to a wheel chair.

The present invention allows an individual to use the same chair for both lounging on a beach and also while swimming (e.g., staying afloat) in water. The design of the chair allows the chair to easily move across sand and on a sloping landscape. The unique design of the chair allows for proper buoyancy and stabilization of the chair in the water. The design and height of the footrest allow the user to independently and easily transfer to and from a wheel chair. The assembled nature of the chair, with its many parts that can be attached and detached, confers portability to the chair. Accordingly, the chair can be carried in a vehicle from place to place. Some of the chair's features increase its portability; for example, the inward curving of the footrest of some embodiments makes it easier to fit the chair into smaller cars. The curved features of the drop seat frame of some embodiments decreases potential of chafing by the chair to a user's body. Adjustability of the drop seat, and of the pull rod of some embodiments, allow the chair to be used by a variety of people (e.g., of different heights, weights, and ages) in a variety of situations (e.g., swim, lounge, move).

BRIEF DESCRIPTION OF THE DRAWINGS

The foregoing and other objects, features and advantages of the invention will be apparent from the following more particular description of preferred embodiments of the invention, as illustrated in the accompanying drawings in which reference characters refer to parts throughout the different views. The drawings are not necessarily to scale, emphasis instead being placed upon illustrating the principles of the invention.

FIG. 12 is a detailed view of an embodiment of the support rod of the drop seat frame having a recess between rings that can be accepted by the key-hole of a key-hole frame attached to the main frame.

DETAILED DESCRIPTION OF THE INVENTION

A description of preferred embodiments of the invention follows.

The present invention relates to a chair that can be used as a lounge chair and also as a swim chair (e.g., a flotation chair) for individuals that are unable to walk or who have trouble walking on uneven surfaces such as sand at a beach. The chair of the present invention allows an individual to be pulled onto the sand by another (e.g., a caddy) to enjoy the beach. A caddy, as defined herein, is a person who pulls the chair and accepts responsibility for the passenger and the swim chair on the beach and in the water. The chair also allows the caddy to pull the individual with ease into the water and helps the individual to swim off of the chair into the water to enjoy the water. Surprisingly, the features of the chair of the present invention allow the chair to be converted from the "lounge" position to the "swim" position (and vice versa), and also allow the chair to be balanced/stabilized in the water. In particular, the chair allows for the seat to be dropped to a proper position to allow for the chair to be well balanced in the water.

Figure 1:
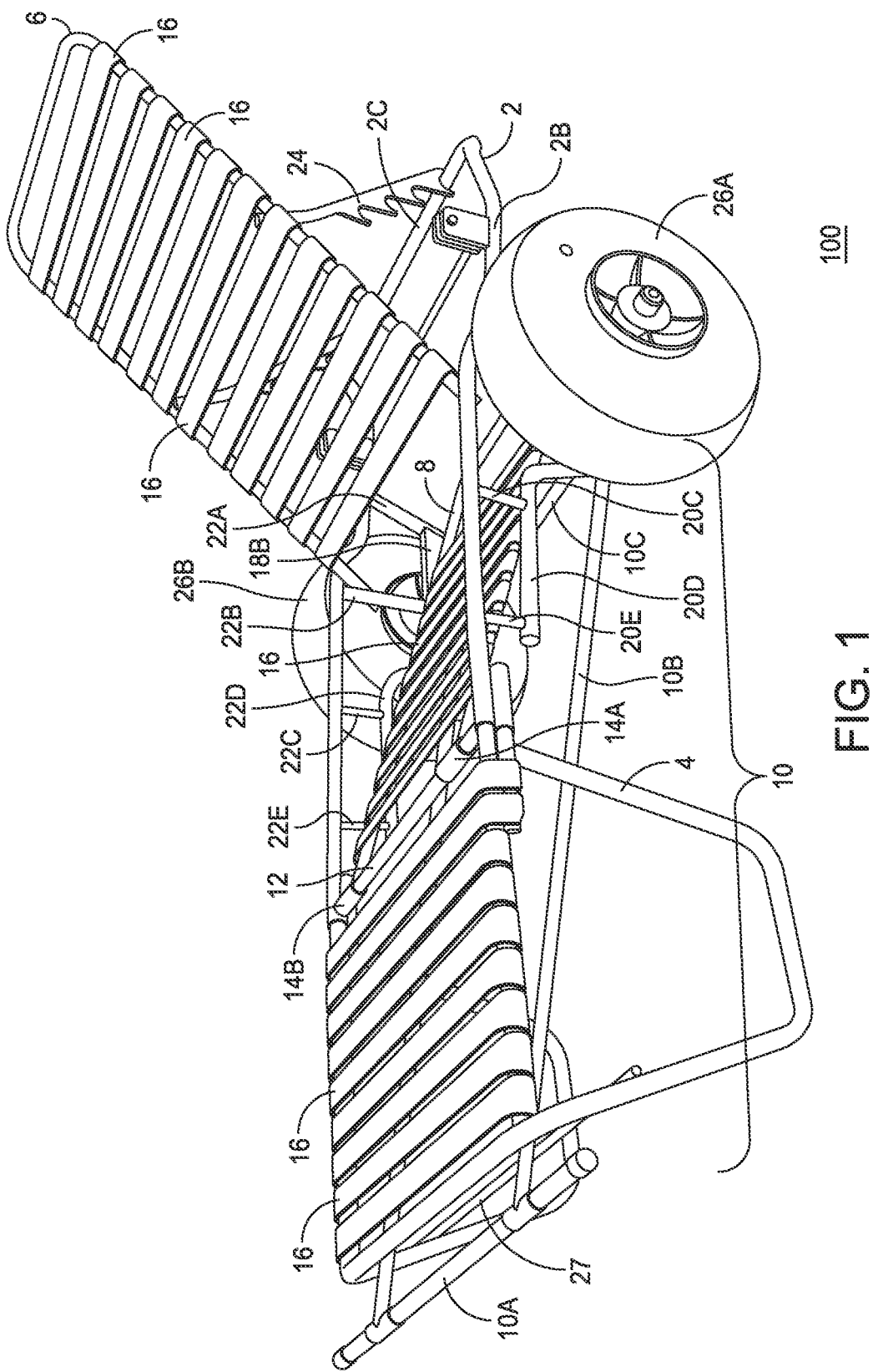
FIG. 1 is a perspective view of the chair of the present invention.
Figure 2:
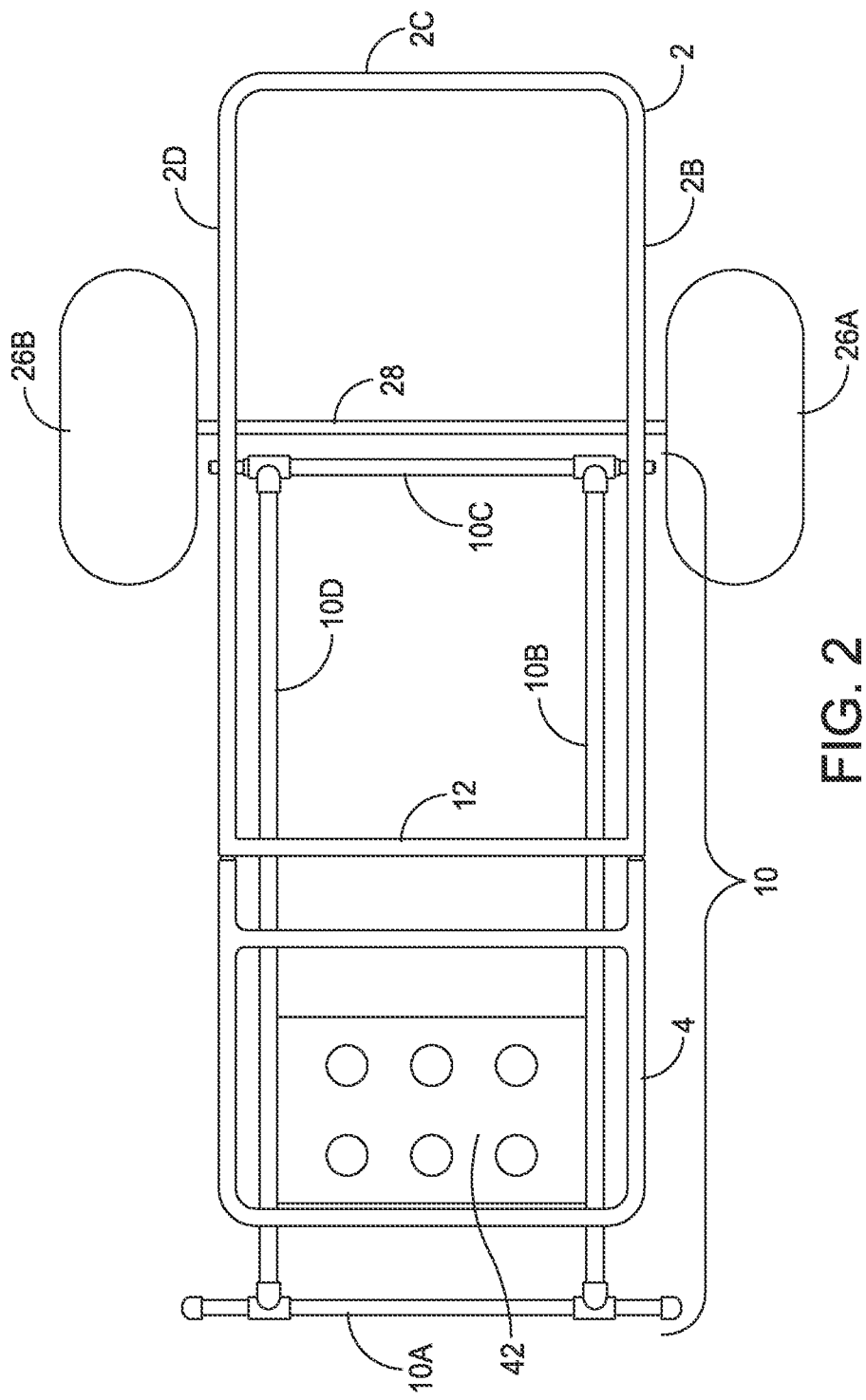
FIG. 2 is a top view of the chair of the present invention showing the main frame, the footrest frame, the pull rod, the wheel assembly and flotation device.

Referring to FIG. 1, chair 100 of the present invention can be seen. The chair has a number of parts, starting with the frame. Main frame 2 supports the middle of the chair, back rest frame 6 supports the backrest of the chair, footrest frame 4 supports the footrest of the chair, and seat frame 8 supports the seat of the chair. In some embodiments, the main frame can support more than the middle of the chair, for example, it can support essentially the full length of the chair. This can be the case for embodiments that have a main frame extending along substantially the full length of the chair, in which the footrest, instead of having its own frame, can be attached to the portion of the main frame furthest away from the backrest. Referring to FIG. 2, main frame 2 has an essentially rectangular shape from a top plan view.

Figure 3:
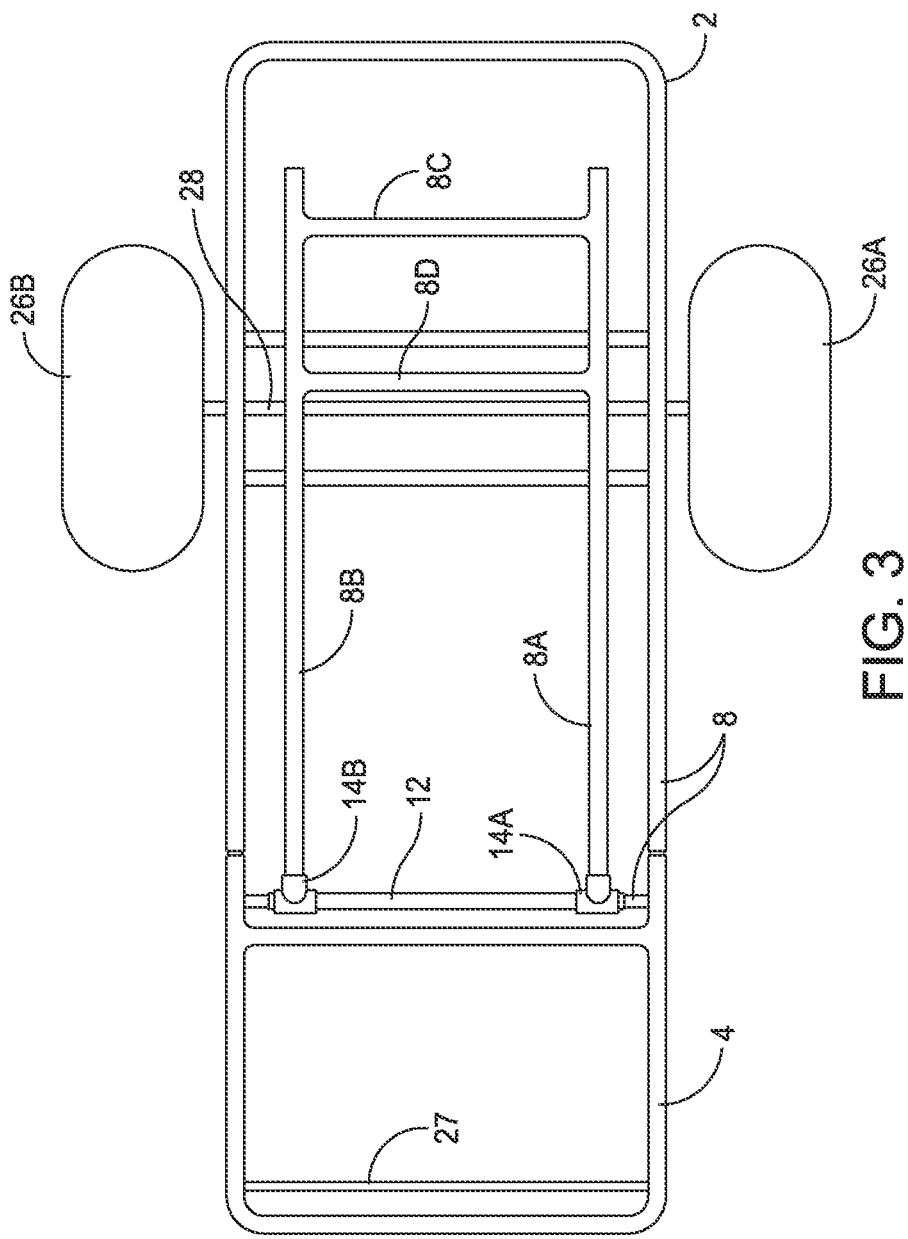
FIG. 3 is a top view of the chair of the present invention showing the main frame, the footrest frame, the drop seat frame, the wheel assembly and flotation device.

Footrest frame 4 attaches to one end of main frame 2 with a male/female mating system in which the female opening receives the male end of footrest frame 4. In an alternative embodiment, the footrest frame can have a female opening, and the main frame can have a male end. In other embodiments, the main and the footrest frames can be co-extending (e.g., welded to each other). In some embodiments, the main frame can extend all the way to the end of the footrest, essentially constituting a single-piece main frame (e.g., a combined main/footrest frame). In embodiments that do not have a pull-rod, the end of the footrest frame or the end of the main frame can act as a handle to pull the chair. The backrest frame attaches to the other end of main frame 2 (shown in FIG. 1). As shown in FIG. 3, seat frame 8 connects to drop seat support rod 12 which connects to the ends of the footrest frame 4. The footrest frame 4 then connects to main frame 2. Seat frame 8 is also essentially a rectangular shape to form the drop seat for the chair. In alternative embodiments, seat frame 8 connects to main frame 2.

The frame of the chair of the present invention can be made from metal tubing and formed and/or welded into the frame of the chair as shown. Any material known in the art or developed in the future can be used to construct the frame and includes for example, metal (e.g., aluminum), stainless steel, wood, plastic, rubber, composite materials and the like. The chair is designed for use in water (including salt water and chlorinated water). In an aspect, the frame and axles are made of aluminum and all of the hardware is stainless steel.

Figure 11:
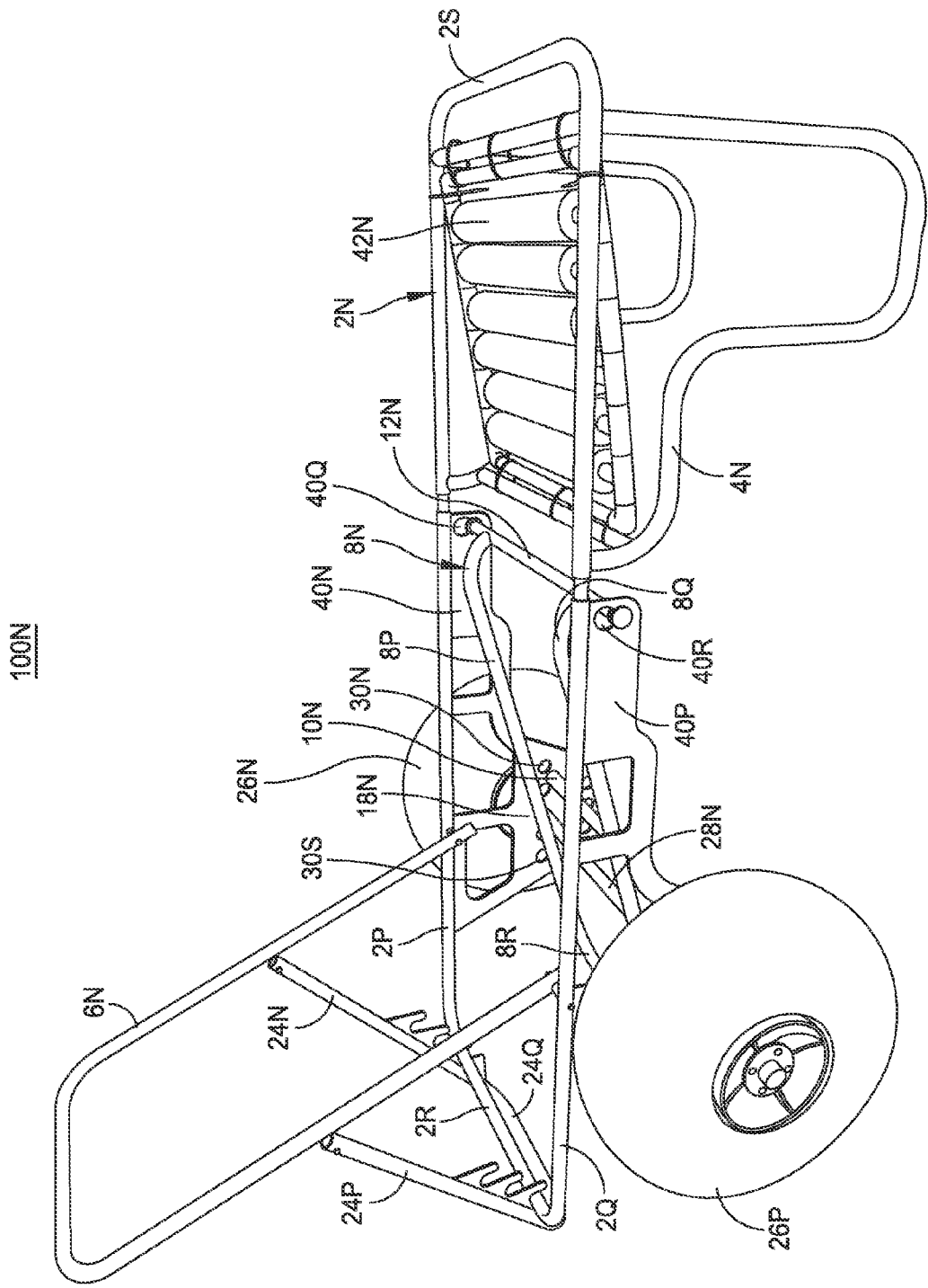
FIG. 11 is a perspective view of an embodiment of the chair of the present invention.

Main frame 2 has supports for a number of items including the drop seat. Seat frame 8 connects to main frame 2 via seat support rod 12. See FIG. 3. Specifically, seat frame 8 is pivotally connected to seat support rod 12, which is welded to main frame 2. The seat frame can be permanently attached to main frame 2 or detachably connected to main frame 2. FIGS. 11 and 12 show an example of the drop seat frame connected to the main frame with a detachable connection. Detachable connections can be made through a variety of mechanisms, for example by forming a key-hole near the main frame that receives a slot of a support rod of the seat frame. The slot of the support rod can exist at both ends of the support rod, and can be formed by two protruding rings on sides, each couple of rings bordering a recess that acts as the slot to be received by the key-hole. Other examples of detachable connections include: each end of the support rod having helical grooves (similar to a screw or a bolt) that align with the internal grooves of the key-holes of the frame (so that the support rod can be threaded into place from one or both sides); each end of the support rod having a single (or in some embodiments more than one) protrusion to prevent it from sliding off; each end of the support rod having one or more retaining rings that prevent it from sliding off (such rings can be pre-manufactured as a part of the support rod, or they can be externally added, some examples including circlips and R-clips); each end of the support rod having one or more blockers (e.g., linchpin) to prevent it from sliding off; each end of the support rod having one or more grooves that can be held in place within the key-hole even without additional protruding structures around it. In some embodiments, elements to reduce friction (such as ball bearings or other bearings) can be added around the area of connection between the support rod and the key-holes, or between the wheel axle and the wheels. Seat frame 8 has side members 8A and 8B and cross bars 8C and 8D. In some embodiments, there is no cross bar 8D. In other embodiments, there can be more cross bars. Although the seat frame is essentially a rectangular shape with two cross bars, the seat frame can take on any shape so long as it defines a drop seat onto which an individual can sit. The seat frame can be any shape so that it accommodates the positioning of the user and the user's ability to easily slide on and off the seat. In an embodiment, the side members of the seat frame can be curved or otherwise shaped to facilitate the user sliding on to the chair. See FIG. 11 for an Example. The seat frame can include cross straps such as straps 16 to support an individual's upper body when seated. The straps are stretched across the metal tubing of any portion of the frame (e.g., backrest frame, drop seat frame, footrest, etc.) sufficient to hold the weight of an individual when the individual is seated on the chair. In an aspect, the straps can be replaced by fabric held in place by lacing passed through eyelets in the fabric and around the metal frame of the member. The frame further includes rod 27 attached to front legs 4 of the frame to provide support for the pull rod and the floatation device. Some embodiments do not have rod 27.

Similarly, main frame 2 has a support for pull rod 10, as shown in FIG. 2. The pull rod includes side members 10B and 10D, a rod that acts as pull rod handle 10A, and pull rod axle 10C. Pull rod axle 10C attaches to main frame 2 via axle support plate 18, shown in FIG. 4. The axle support plate shown in the figure has a plurality of apertures or openings, one of which receives and supports pull rod axle 10C. The axle support plates are attached to main frame 2 through leg frame members 20A-E and 22A-E and also serve to support the wheel axle, which is further described herein. In alternative embodiments, the pull rod can be attached to the wheel axle. In some embodiments, there is no pull rod, associated side members, or pull rod axle. In an embodiment, the axle support plates are held in place with an axle support rod (not shown). The axle support rod acts to keep the axle plates apart at a desired distance from each other. An axle support rod can be permanently attached (e.g., welded) to the axle support plates, in effect stabilizing them. In other embodiments, the leg frame members can be constructed as a single-piece item (e.g., members 20A-E being a single member having essentially the same overall shape as the shown members 20A-E).

Main frame 2 also pivotally connects backrest frame 6, and main frame member 2C supports the back rest position. See FIG. 1. The back rest is supported by arm 24 which has a plurality of projections that engage member 2C of the frame to hold the back rest in position during use. In some embodiments, there can be a single arm (e.g., on the center), two arms (e.g., on the sides), or more than two arms. In an embodiment, two arms can be connected from their bottom portions. Main frame 2 also has a support for hinged bail 32 that engages the drop seat to maintain the drop seat in the "lounge" or "up" position, as further described herein.

The chair of the present invention further includes a wheel assembly. See FIG. 4. The wheel assembly includes tires 26A and 26B, wheel axle 28 and wheel axle support plates 18A and 18B. Wheel axle support plates can be separately attached to the leg frame members, or can be substantially fused (e.g., welded) to the leg frame members. The wheel axle is also referred to herein as the main axle. The tires provide floatation forces when in the water. The size and buoyance of the wheels impact the floatation of the chair. The diameter of the tires relates to the maximum load that the chair can handle and remain floating during use in the water. The diameter of the flotation wheels, when mounted, can range between about 12 inches to about 24 inches, and particularly in a range between about 16 inches and about 20 inches. In an embodiment, the tires are low pressure tires ranging between about 1 $lb/in^2$ to about 5 $lb/in^2$, and in particular between about 2 $lb/in^2$ and about 4 $lb/in^2$. In an example, the wheels of the present invention can be obtained from Wheeleze, Inc. (Benicia, Calif.). A person having a weight ranging between about 40 lbs to about 350 lbs can use the chair of the present invention. In an embodiment, to maintain appropriate floatation and balance of the chair while in the water, different size tires can be used to accommodate the load. In an aspect, all of the various size tires mount on one inch diameter axles.

In a particular example, Wheeleze Item No. WZ1-49U was used with the present invention and had a diameter of about 19.3 inches and a maximum load capacity of 264 lbs. per wheel. A pair of these wheels provides adequate floatation to support passengers ranging in weight from 125 lbs to 275 lbs. If additional floatation is required, a longer axle permits the addition of a second pair of wheels. This double-wheel arrangement provides the flotation force required for passengers weighing more than 275 lbs. If the passenger weighs less than 125 lbs, the smaller wheels having a diameter of 16.5 inches and a maximum load of 176 lbs (Wheeleze Item No. WZ1-42U) per wheel can be used. In an embodiment, the wheels are retained on the axle by a retainer pin, such as Quick Clip Retainer Pins (Wheeleze Item No. 4-AL254-467), which permit the changing of wheels or the relocation of the axle.

Figure 4:
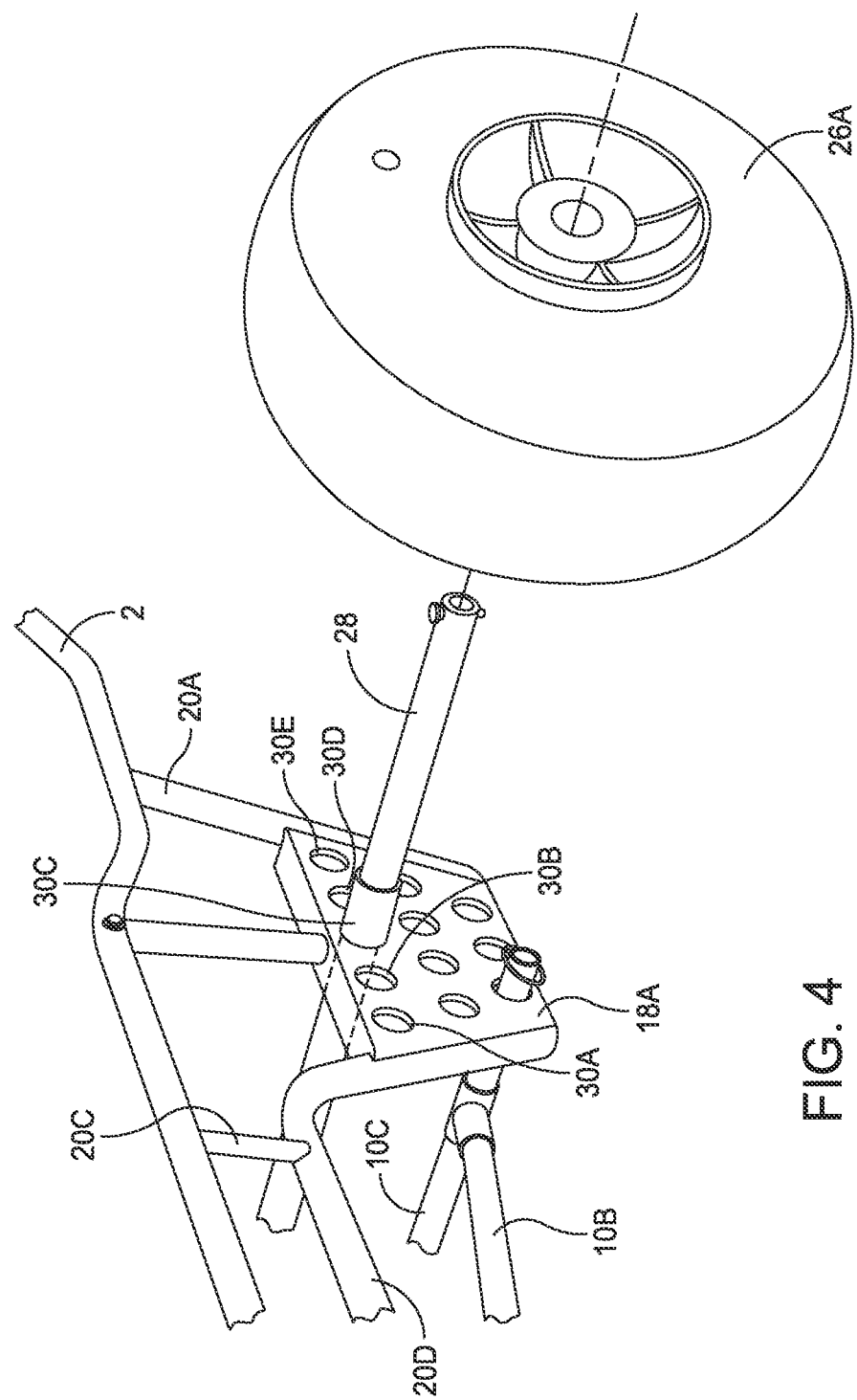
FIG. 4 is a detailed view of the wheel assembly, the axle support plate, and a portion of the frame.
Figure 5:
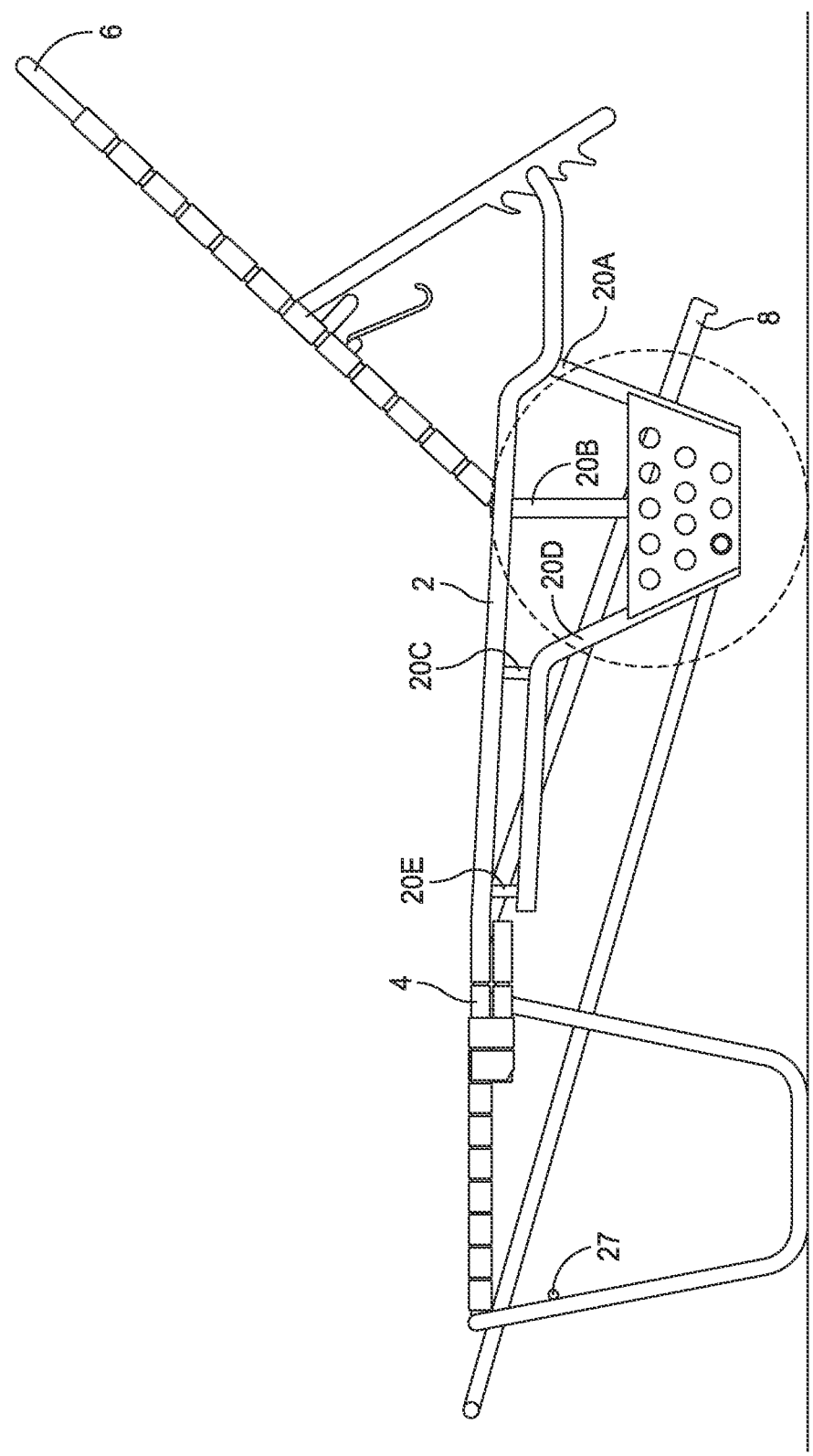
FIG. 5 is a side view of the chair of the present invention without the wheels attached.

Axle support plates 18A and 18B, shown in FIG. 1 and better seen in FIGS. 4 and 5, as described herein have a plurality of apertures or openings. The openings are present in a series of rows. In the embodiment, the top row of openings 30A-30E is shown in support plate 18A. The chair of the present invention includes a pair of functionally identical axle support plates, one on each side of the main frame. In FIGS. 4 and 5, the axle support plate has twelve holes, arranged in three horizontal rows. In an embodiment, the top row provides axle support for five locations of the main axle when 19½ inch wheels are employed. In an aspect, the second row has four holes when 16½ inch wheels are employed. In an embodiment, the first hole in the third row supports pull rod axle 10C and the remaining two holes are available to support the axle when small wheels are appropriate, in the instance of off-beach lounging. The axle support plates allow for adjustability of both the wheel axle and the pull rod, however, this adjustability, in an embodiment, is optional. In an embodiment, the wheel axle and/or the pull rod axle can be attached in a more permanent way (e.g., welded) as opposed to being adjustably placed. In an embodiment, the pull rod axle and the wheel axle can be the same axle. In the embodiment shown in the figures, the wheel axle is adjustable to provide balanced flotation in the water, and the pull rod is adjustable to allow the caddy to position the pull rod axle for ease of transport. In certain aspects, a range of between 2 and about 8 openings can be present on the axle support plate.

In the case of the top row of openings to receive the wheel axle, the openings can be used as follows. The pairs of opening in the top row axle support plate 18A is referred to herein as 30A, 30B, 30C, 30D, and 30E, as shown. Support plate 18B has a mirror image of the same set of openings. The two support plates do not need to be exactly mirror images of each other, as long as their use does not create a significant imbalance in the operation of the chair. The wheel axle is placed in the same position in each of the support plates, and "AA" refers to the position in which the wheel axle sits. "AA" refers to the wheel axle being in the openings of both wheel axle support plates closest to the front of the chair and "EE" refers to the wheel axle being in both openings closest to the rear of the chair. The axle being in corresponding openings B, C or D is referred to being in BB, CC or DD, etc. When the wheel axle is mounted in CC, half of the empty chair's weight is forwarded of the axle, half behind the axle. With a passenger aboard, however, the fore/aft balance of the chair is affected by: (a) the weight of the passenger, (b) the distribution of the weight (tall-thin passenger, short-heavy passenger, amputees, etc.) or both. These pairs of openings provide locations for the wheel axle and for adjusting the fore/aft stability of the chair and thus enabling the chair to serve passengers of different weights and weight distributions.

To change the position of the wheel axle, the present wheel is removed and the axle is pulled out from the other side. The axle with the retained wheel still mounted is inserted in the desired opening of one axle support plate and placed in the corresponding opening in the other axle support plate. The removed wheel is secured with a releasable attachment such as a retaining pin.

Pull rod frame 10 is a device that is used to pull and maneuver the chair and is attached to the axle support plate by pull rod axle 10C. The pull rod frame includes two side members 10B and 10D, handle 10A and a pull rod axle 10C. The location of the pull rod axle 10C is positioned under the weight of the person sitting in the chair. Pull rod 10 is a rectangular assembly of two shafts (e.g., 50 inches long) separated by shafts (e.g., about 16 inches) at each end. See FIG. 2. In the figure, it is attached to main frame 2 by the pull rod axle 10C which is typically supported by the forward hole in the third row of the axle support plates. The pull rod travels at an upward angle, under the drop-seat and footrest, and extends beyond the front of the chair. In an embodiment, the pull rod extends past the front of the chair in an amount between about 2 and about 12 inches, and in an embodiment between about 4 and about 8 inches (e.g., about 6 inches). The front end member, member 10A, can be used as a handle. In an embodiment member 10A extends past the frame of the side members 10B and 10D to allow the caddy, for example, to ask a friend to help pull the chair in circumstances when more pulling force is required. The entire pull rod, including its handle, side members, and axle are optional in some embodiments.

Attaching the pull rod to the axle support plates transfers the "pull force" directly to the main axle and both wheels. The upward vector of the pull force tends to "lift" the wheels over rocks and irregularities in the rolling surface, reduces the load on the tires and minimizes the effort required to pull the chair of the present invention.

In an embodiment, an assembly of foam blocks 42 or other floatation devices is attached to the two shafts near the front end of the pull rod. See FIG. 2. In other embodiments, such flotation devices can be any shape and include cylindrical shapes, spherical shapes, rectangular shapes, or irregular shapes. It assists in maintaining the fore/aft stability of the chair when the passenger is aboard and provides the flotation force needed to maintain the toe of the chair at the surface of the water when there is no passenger aboard. Flotation devices can be made from one or more parts in any material that increases the buoyancy of the chair. Some of the examples include flotation devices made from various foams (e.g., Polyvinyl-chloride, Kapok, organic nitrile compound known as Gaia™), those made by inflating a material (e.g., with air, Nitrogen, Helium, etc.) to impart buoyancy to it, and those that are hybrids (e.g., including foams while also being inflatable).

The chair of the present invention further includes a drop seat. Drop seat 8 can be set in the "up" position (also referred to as the "lounge" position), or in the "down" position (also referred to "swim" position). The positioning of the drop seat is accomplished, in an embodiment, by a movable catch. When the catch engages the drop seat, the drop seat is in the up position and when the catch is moved and the seat is positioned blow the catch, it rests on the wheel axle and is in the down position. When in the up position, the seat is coplanar with the main frame. When in the down position, the seat is angled below the plane of the main frame in a range between about 10 degrees to about 40 degrees from horizontal, and in particular between about 15 degrees and about 30 degrees. When the wheel axle is in position AA, CC and EE, the seat is angled below the plane of the main frame from horizontal at about 24.5 degrees, 21.5 degrees and about 18.5 degrees, respectively.

Figure 7:
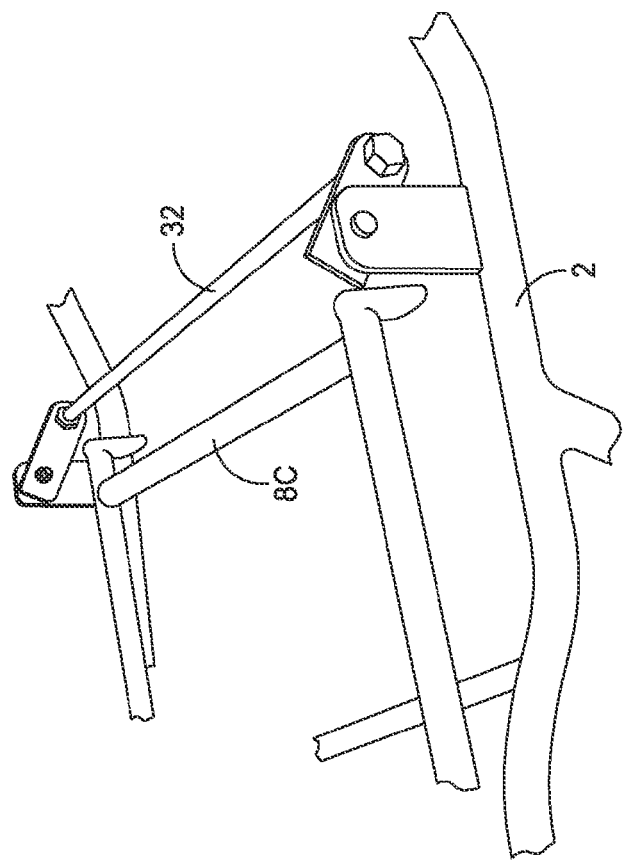
FIG. 7 is a detailed view of the hinged bail not engaged with the drop seat wherein the drop seat is available to be moved to the down position.
Figure 6:
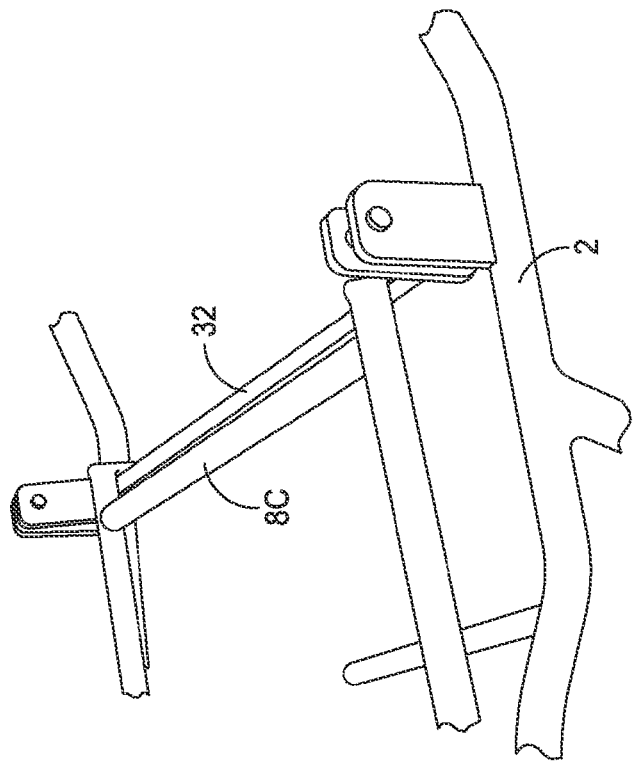
FIG. 6 is a detailed view of the hinged bail engaging the drop seat in the up position.

An example of the movable catch is hinged bail 32. See FIGS. 6 and 7. The bail holds the drop seat in the up position and is coplanar with the main frame. See FIG. 6. The seat, along with the footrest and the backrest, has fabric or strapping to support portions of the user's body. The drop-seat is attached to the main frame by an axle (drop seat support rod) that holds the front edge of the drop-seat adjacent to the rear edge of the footrest. In some embodiments, that axle can be situated lower than the top portion of the main frame, and then the rest of the seat frame can curve up so as then create a smoother surface for the user. To enhance portability, the axle can be attachable/detachable as well. In the embodiment shown in the figures, when the hinged bail is pivoted or moved out from under the seat, the rear end of the seat tilts down 20 degrees from the horizontal and rests on the axle that supports the vehicle's wheels or on the axle support rod. See FIG. 7 showing hinged bail 32 being moved to allow the unsupported end of the drop seat to rotate down to rest on the wheel axle, the axle support rod, or both depending on the relative positions of the when axle and the drop seat support rod. In this down position, called the "swim" position, the center of mass of the chair-plus-passenger is lowered and the flotation forces and lateral stability of the chair in the water are greatly improved.

Figure 8:
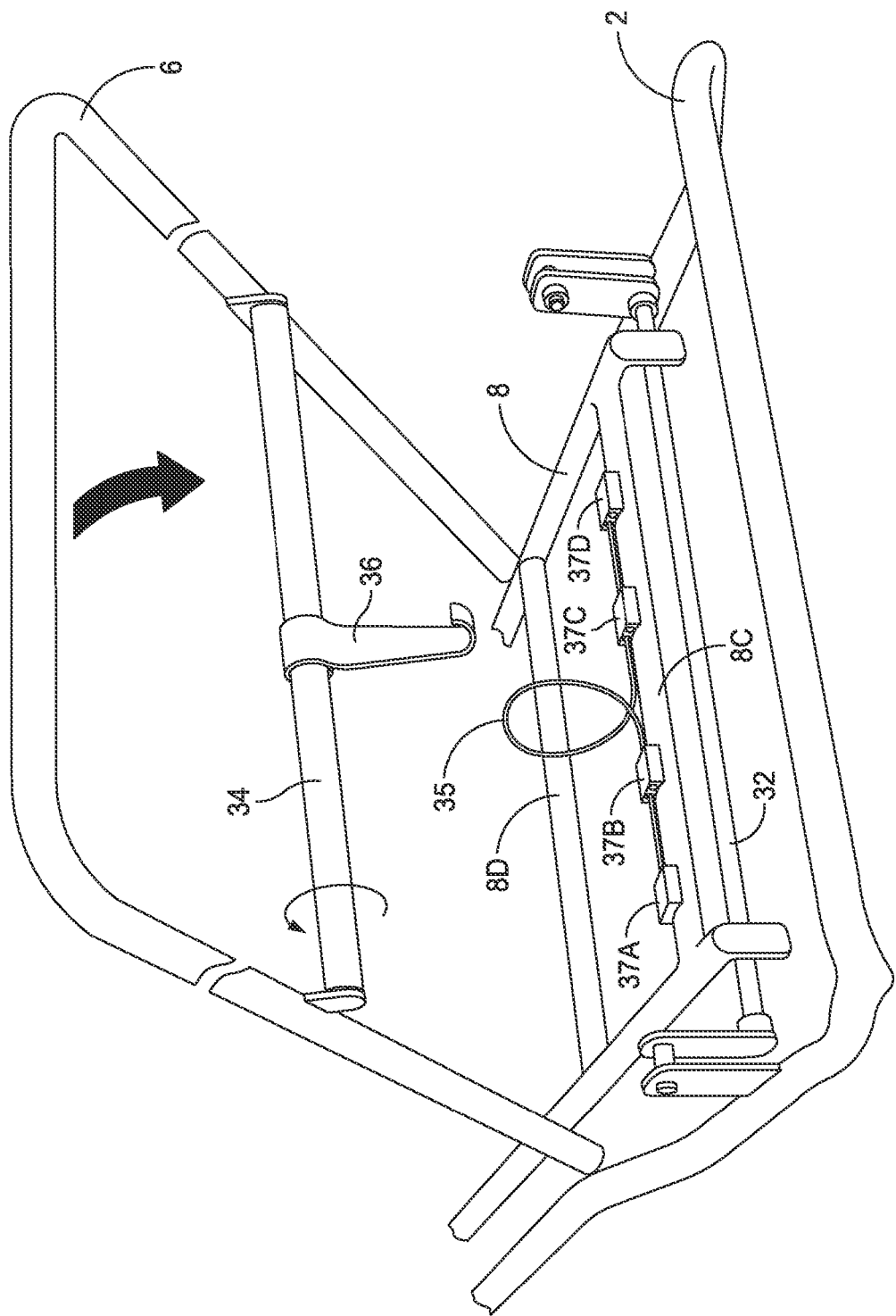
FIG. 8 is a detailed view of the hinged bail supporting the drop seat. The back rest is being lowered so that the connecting roll can be rotated to engage the hoist with the cable-loop handle that is welded to the cross bar at the rear of the drop seat.

Lowering (swim position) and raising (lounge position) the drop seat is accomplished by creating a physical connection between the rear of the drop-seat and the backrest so that moving the backrest results in moving the drop-seat. FIG. 8 shows this connection as a short connecting rod, referred to as hoist 36, mounted on the connecting roll 34. Rotating connecting roll 34 engages hoist 36 with a handle of some type on the seat frame. Such a receiving mechanism includes a cable loop. The mechanism can also be adjustable so that the hoist can engage the receiving mechanism at varying heights to allow for adjustability of the backrest. In particular, FIG. 8 shows cable loop 35 attached to the drop seat cross bar 8C. Cable loop 35 is attached to cross bar 8C with blocks 37A-D having one or more cylindrical openings to receive the cable loop. Hoist 36 catches cable loop 35 so that the backrest frame engages the drop seat. The distance between the loop, a fixed handle and the connecting roll and the length of the hoist are interrelated and can be adjusted to allow the hook to catch the loop. In an aspect, the length of the cable loop can be adjusted and fixed during assembly of the chair. In an embodiment, the cable loop could be replaced by a handle or ring.

Figure 9:
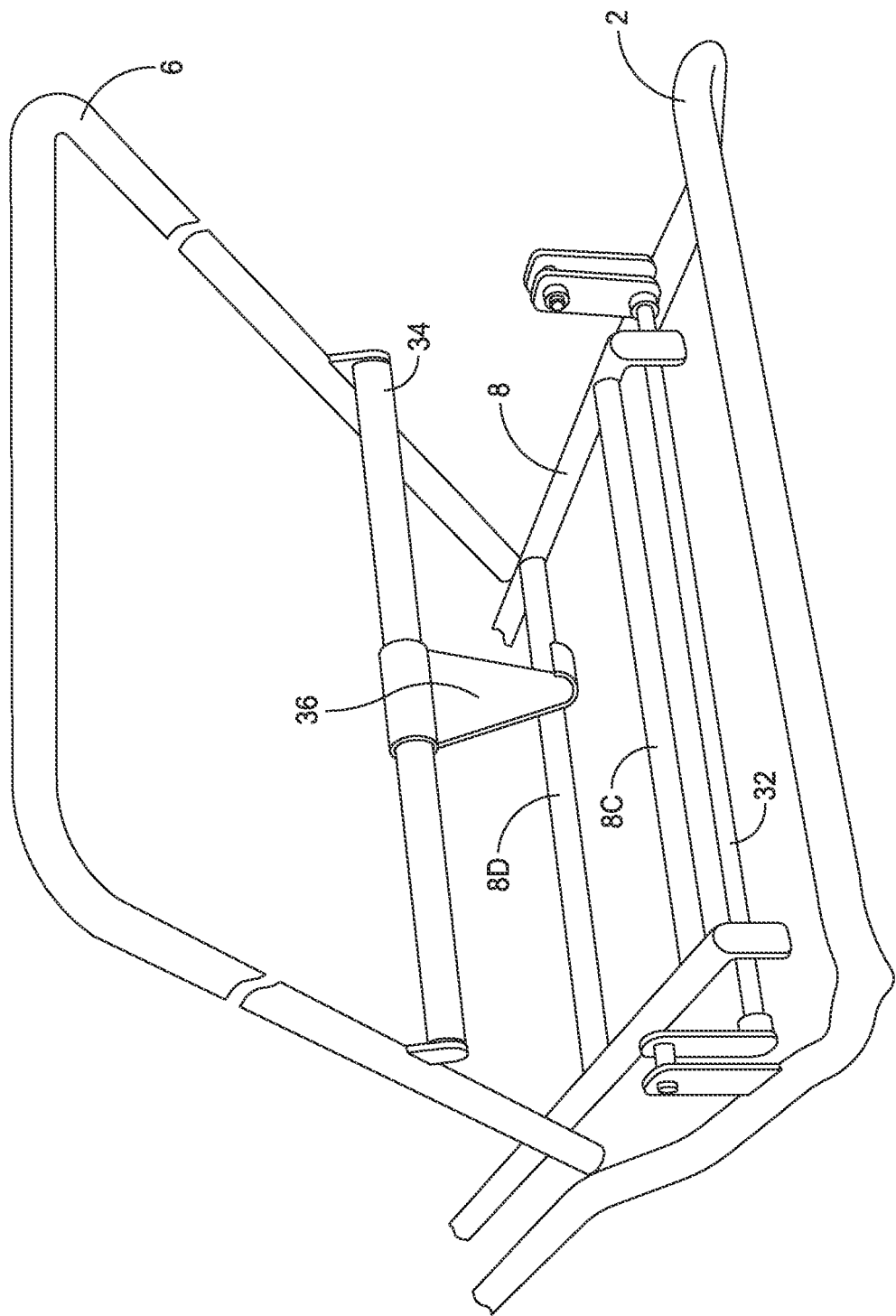
FIG. 9 is a detailed view of the backrest and the drop seat wherein the hinged bail is engaged with the drop seat in the up position, and the connecting roll and hoist is not engaged with the frame of the drop seat.
Figure 10:
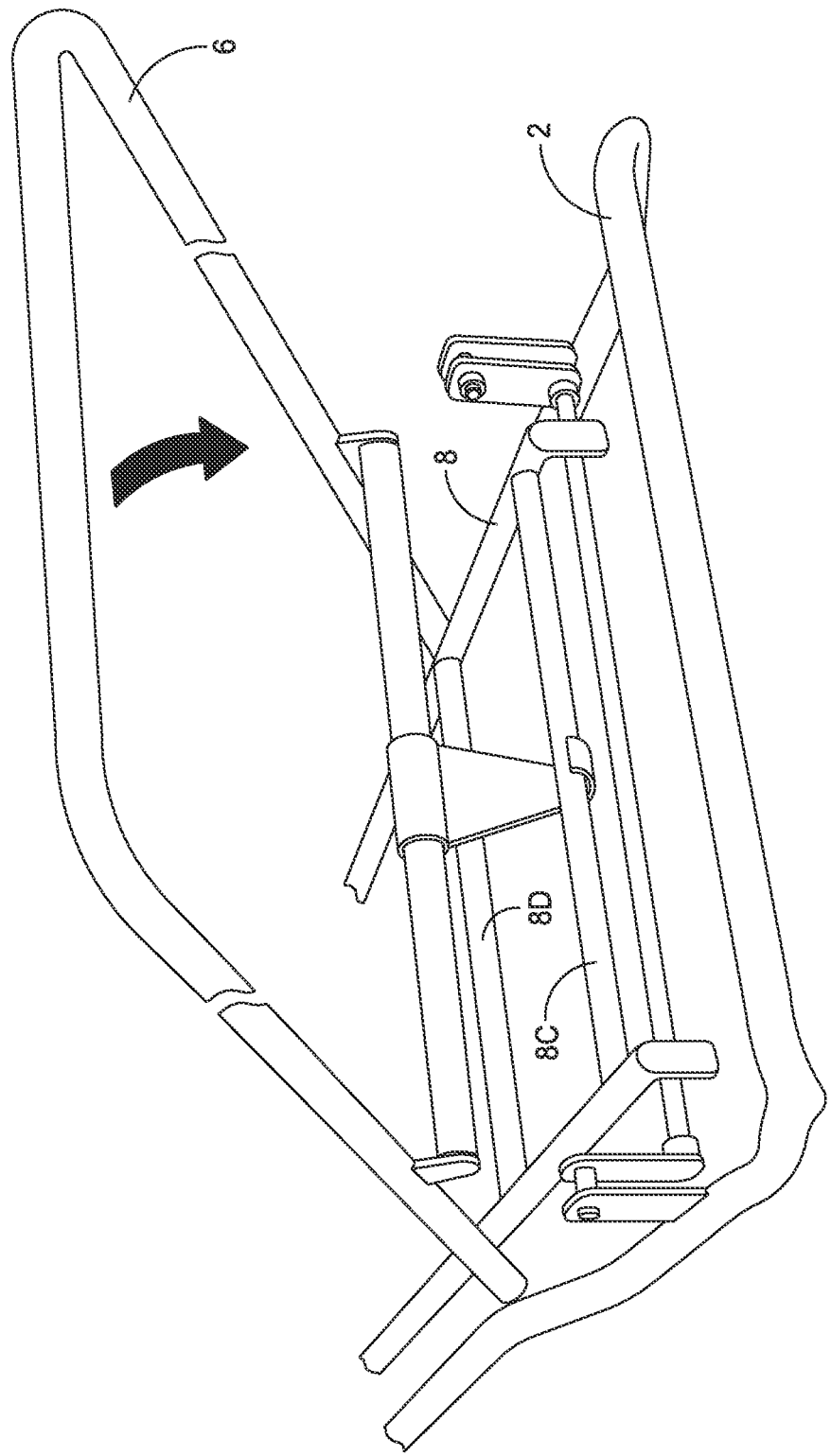
FIG. 10 is a detailed view of the backrest and the drop seat wherein the hinged bail is engaged with the drop seat in the up position, and the connecting roll and hoist is engaged with the frame of the drop seat.

FIGS. 9 and 10 show another embodiment for the backrest to engage the drop seat. In these figures, hoist 36 engages cross bar 8C directly. In an embodiment, the length of the hoist can be increased, decreased, and/or made adjustable to reach the crossbar.

Lowering the drop seat involves lowering the backrest and connecting the hoist to the drop seat frame by rotating the connecting roll. One then lifts the backrest, rotates the bail from under the drop seat, and lowers the backrest until the drop seat rests on the axle or on the axle support rod. Raising the drop seat involves lowering the backrest frame until the hoist is in contact with the drop seat frame and/or cable loop. One then lifts the backrest and simultaneously rotates the bail under and permits the drop seat to be lowered to rest on the bail and then removes the hoist from the cable loop/cross bar. The backrest can be repositioned as desired using the backrest arm.

The design of the drop seat provides an anti-pinch seat. The anti-pinch design provides a gap between the frame of the drop seat and the main frame. The gap between the frames can range in an amount between about 1 inch and about 4 inches, and in particular, between about 2 inches and about 3 inches. In an example, the frame of the drop-seat is 17 inches wide. In the "up" position (the horizontal position) it is enclosed within the main frame of the chair which has an interior width of 21.5 inches. In this horizontal plane, the distance between the movable seat and the frame is 2.25 inches on each side. This gap of 2.25 inches on each side reduces the likelihood that a passenger would be pinched (perhaps painfully) when the seat is being elevated to the "up" position.

In an embodiment, the position of the drop seat does not need to be adjustable and can be always in the down position. In this case, a hinged bail and hoist mechanism are not needed. In this embodiment, the drop seat and back rest can be shorter than that shown in the figures.

The chair of the present invention includes footrest 4. The footrest is an open frame with strapping or fabric. The footrest, in an aspect, provides a transfer station or area that allows the user to transfer to and from a wheel chair. The footrest easily allows transfer to and from the wheel chair because of its height and also because of its size and shape. The footrest, as described herein, is a rectangular frame with a cross bar and has a "U" shaped legs attached to the frame. See FIGS. 1 and 5. However, the shape of the legs can be an irregular shape as shown in FIG. 11. For example, the inward curving of the footrest near its middle portion makes it fit the interior spaces of vehicles (e.g., compact cars) better. The footrest, in this embodiment, attaches to the main frame with a male/female attachment but can be attached using any mechanism known in the art or developed in the future. The footrest of the chair can be detached from the main frame with the very little effort by removing two small wing nut bolts and pulling the frames apart. In an embodiment, this step reduces the length of the chair from 65 inches to 44 inches and makes it easier to transport, to ship, and to store. In alternative embodiments, the footrest can be welded to the main frame as well.

The combination of the drop seat and footrest allow for easy transfer on and off the chair of the present invention. For example, the user uses the chair of the present invention in the water and the drop seat is in the swim position. Being in the swim position allows the user to get on and off the chair easily, and the chair is stable and properly buoyant. After swimming is done and the user swims onto the chair and sits in it, the caddy takes the chair out of the water and wheels the chair onto the sand. The caddy then positions the drop seat in the lounge position (e.g., raising the drop seat by engaging the hoist to rest on the hinged bail). In the lounge position which makes the drop seat co-planar with the footrest, the user can independently slide down the surface and with the footrest being a comparable height as the wheel chair, the user can transfer to a wheel chair.

The height of the footrest is similar or the same of that of the seat a wheel chair. Having a similar height allows as a wheelchair allows for easy transfer between a wheelchair and the chair of the present invention. In an embodiment, the horizontal surface of the footrest of the chair of the present invention ranges between about 15 and about 23 inches and in particular, about 19 inches above ground. Nineteen inches is also the typical height of the seat of a wheelchair. The height of 19 inches helps reduce the effort required of passengers in wheelchairs to transfer on to (or off of) the chair of the present invention.

In use, the caddy simply engages the drop seat so that the drop seat is in the swim or down position and pulls the chair into the water using the pull rod. Once in the water, the chair remains balanced and stable. The user of the chair can slide off into the water and go for a swim. After the user is done swimming, the caddy holds the chair and the user slides onto the chair and the caddy pulls the chair back to shore. The caddy can put the drop seat in the lounge or up position, as described herein. The user can enjoy the chair and, because it is about 19 inches in height, can stand up or transfer with ease.

Referring to FIG. 11, chair 100N of the present invention is seen with some of its components. Some items, such as straps, have been omitted for clarity. In this embodiment shown, main frame 2N is seen to be substantially a planar rectangle formed of main frame members 2P, 2Q, 2R (short side near the backrest), and 2S (short side near the footrest). Main frame member 2S extends forward from the front of the chair, and can be used to pull the chair when no pull rod is present (or as an alternative way of pulling the chair even when a pull rod is present). Member 2S, in some embodiments, is the footrest frame instead of being part of the main frame. The designation of member 2S as the footrest frame or as a main frame member mostly depends on whether the footrest is detachably attached to the main frame. If it is detachably attached, member 2S is referred to as the footrest frame; if it is permanently attached (e.g., welded or single-piece), then it can be referred to as main frame member as well (even though calling it a footrest frame would be acceptable in either scenario). A pull rod is optional in this embodiment; if present, it can be attached to a pull rod axle, or to wheel axle 28N. Axle support rod 10N is shown to be fixed (e.g., welded) to axle support plate 18N. In alternative embodiments, a pull rod axle can be placed into any of the openings, as previously explained, within axle support plates (only one axle support plate 18N shown). Openings 30N and 30S are openings in the axle support plate, and are shown in the figure with labels. Various structural components used to connect the axle support frame to the rest of the chair, such as the leg frame members of other embodiments, are shown here to be made as essentially fused, or coexisting, or single-piece items together with the axle support plates. In addition, axle support plate 18N is further seen to be continuously connected to key-hole frame 40N on the distal side of the chair in FIG. 11. (On the proximal side, key-hole frame 40P is visible; however the corresponding axle support plate is not fully visible). The key-hole frame does not need to be continuous with the axle support plate. The key-hole frame can extend from the main frame or from any portion of the chair so that it provides support for the drop seat support rod 12N. Each key-hole frame includes at least one key-hole, for example key-hole 40Q seen on the distal side in FIG. 11 and key-hole 40R on the proximal side. The key-holes accept support rod 12N. In this embodiment, support rod 12N is seen to be welded to the rest of seat frame 8N at side member 8P and at side member 8Q shown in FIG. 11. Side members 8P and 8Q are connected on the back side by side member 8R.

In FIG. 11, side members 8P and 8Q of the drop seat have a curvature near the middle side of the chair. In this embodiment, the level of support rod 12N is below the level of main frame 2N, therefore, at the point of contact with support rod 12N, side members 8P and 8Q are at a height that is below the height of main frame 2N. Starting from that point of contact with support rod 12N, side members 8P and 8Q curve up, and then curve down toward the lower back side (e.g., toward the wheel axle) of the chair. Such a design has the advantage of preventing or reducing damage (e.g., chafing, abrading, rubbing, irritating) to a user (e.g., a user's legs).

Also seen in FIG. 11 are tires 26N and 26P. On back side of the chair, arms 24N and 24P connect the back rest frame 6N to main frame member 2R. The two arms, 24N and 24P, are seen to be connected to each other in this embodiment from their lower sides by arm connector 24Q. On the front side of the chair, foam blocks 42N are visible. Foam blocks provide additional buoyancy to allow the chair, or a combination of the chair with a user, to float in/on water. Underneath the foam blocks, footrest 4N is shown. The footrest, in this embodiment, is welded into the member 2S (which, depending on the embodiment, can be referred to as the footrest frame or as the main frame member). In this embodiment, the footrest has an inward curve situated near the middle side of the chair, instead of having a simpler "U" shape. Such an in-folding allows the chair to be more easily fitted into a vehicle (e.g., after being disassembled).

Additional components that can be included alongside those shown in FIG. 11 include straps, one or more hinged bails, one or more hoist mechanisms and other components described herein.

Turning our attention to FIG. 12, a detailed view of an embodiment of the support rod and its connection to the main frame is shown. Support rod 12N terminates on each side by a couple of circular protrusions (e.g., toroidal rings), having a recess in between them. FIG. 12 shows ring 8S, recess 8T, and ring 8V. The end of the support rod having the recess bordered by rings can be passed through the larger upper part of the key-hole opening (key-hole 40Q) and then settled down into the lower part of the key-hole opening by positioning the recess in line with the key-hole frame and the rings outside on each side of the key-hole frame. This recessed design of the ends of the support rod enables removal and insertion of the seat frame into the key-holes of the key-hole frames, essentially allowing its disconnection from and connection to the chair. One advantage this confers is that the chair becomes portable, for example to save or to transport in a vehicle.

The relevant teachings of all the references, patents and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. A chair to assist a physically challenged individual in swimming, the chair comprising:
   a) a main frame comprising a top frame member and two side frame members;
   b) two axle support plates, at or in communication with the side frame members of the main frame, each of the axle support plates having two or more openings to receive a wheel axle and a pull rod axle;
   c) a wheel assembly comprising:
      i) two or more tires, wherein the tires are flotation devices; and
      ii) the wheel axle that connects the two or more tires;
   d) a pull rod frame comprising the pull rod axle, two pull rod side members, and a pull rod handle;
   e) a drop seat to support the individual while sitting, the drop seat comprising a drop seat frame and a drop seat support member, the support member being pivotally connected to the main frame; wherein the drop seat frame has a length and a width, wherein the length is longer than the width, wherein the drop seat, when in use, is in a position comprising a swim position or a lounge position, and wherein the drop seat frame in the swim position is lower along a substantial portion of the length as compared to the lounge position; and
   f) a backrest frame that connects to the main frame.

2. The chair of claim 1, further comprising a footrest comprising a footrest frame, a footrest support, and one or more legs, the footrest being detachably connected to the main frame.

3. The chair of claim 1, wherein the drop seat and the backrest are detachably connected.

4. The chair of claim 1, wherein when the drop seat is in the swim position, the drop seat rests on the wheel axle.

5. The chair of claim 1, wherein when the drop seat is in the lounge position, the drop seat is substantially coplanar with the main frame.

6. The chair of claim 3, wherein the drop seat and the backrest are detachably connected by a mechanism that comprises a connecting roll with a hoist attached to the backrest and a hinged bail attached to the main frame.

7. The chair of claim 1, wherein the pull rod handle extends past the main frame by about 1 to about 6 inches.

8. The chair of claim 2, wherein the footrest legs have a height that is the same as a height of a wheelchair seat.

9. The chair of claim 1, wherein the diameter of the tires, when mounted, ranges between about 12 inches and about 24 inches.

10. The chair of claim 9, wherein the tires have a pressure between about 1 lb/in$^2$ to about 5 lb/in$^2$.

11. A chair to assist a physically challenged individual in swimming, the chair comprising:
   a) a main frame comprising a top frame member and two side frame members;
   b) two axle support plates, at or in communication with the side frame members of the main frame, each of the axle support plates having one or more openings to receive a wheel axle;
   c) a wheel assembly comprising:
      i) two or more tires, wherein the tires are flotation devices; and ii) the wheel axle that connects the two or more tires;

d) a drop seat to support the individual while sitting, the drop seat comprising a drop seat frame and a drop seat support member, the support member being pivotally connected to the main frame; wherein the drop seat frame has a length and a width, wherein the length is longer than the width, wherein the drop seat, when in use, is in a position comprising a swim position or a lounge position, and wherein the drop seat frame in the swim position is lower along a substantial portion of the length as compared to the lounge position; and e) a backrest frame that connects to the main frame.

12. The chair of claim 11, further comprising a pull rod assembly that comprises a pull rod axle, two pull rod side members, and a pull rod handle, wherein the pull rod axle is received by the openings of the axle support plates.

13. The chair of claim 11, further comprising a footrest, the footrest being attached to the main frame.

14. The chair of claim 13, the footrest having an inward curving shape on its top facing side.

15. The chair of claim 11, the drop seat support member having, on each end, a recess between two rings.

16. The chair of claim 15, further having one or more key-hole frames, each key-hole frame being at or in communication with one of the side members of the main frame, wherein each key-hole frame receives one of the recesses of the drop seat support member.

17. The chair of claim 11, the drop seat frame being curved near a point of contact with the drop seat support member, wherein the drop seat support member contacts the chair below the main frame and curves up toward it to reach a level substantially close to or the same as the level of the main frame.

18. The chair for claim 13, further having one or more flotation members at the footrest.

19. A method of using a chair to assist a physically challenged individual to enter into water to swim, the chair comprises:
   a) a main frame comprising a top frame member and two side frame members;
   b) two axle support plates, at or in communication with the side frame members of the main frame, each of the axle support plates having one or more openings to receive a wheel axle;
   c) a wheel assembly comprising:
      i) two or more tires, wherein the tires are flotation devices; and
      ii) the wheel axle that connects the two or more tires;
   d) a drop seat to support the individual while sitting, the drop seat comprising a drop seat frame and a drop seat support member, the support member being pivotally connected to the main frame; wherein the drop seat frame has a length and a width, wherein the length is longer than the width, wherein the drop seat, when in use, is in a position comprising a swim position or a lounge position, and wherein the drop seat frame in the swim position is lower along a substantial portion of the length as compared to the lounge position; and
   e) a backrest frame that connects to the main frame;
wherein the method comprises the steps of:
   a) engaging the drop seat to position the drop seat in a swim position; and
   b) pulling the chair into the water with an individual seated in the chair.

20. A method of using a chair to assist a physically challenged individual on land, the chair comprises:
   a) a main frame comprising a top frame member and two side frame members;
   b) two axle support plates, at or in communication with the side frame members of the main frame, each of the axle support plates having one or more openings to receive a wheel axle;
   c) a wheel assembly comprising:
      i) two or more tires, wherein the tires are flotation devices; and
      ii) the wheel axle that connects the two or more tires;
   d) a drop seat to support the individual while sitting, the drop seat comprising a drop seat frame and a drop seat support member, the support member being pivotally connected to the main frame; wherein the drop seat frame has a length and a width, wherein the length is longer than the width, and wherein the drop seat, when in use, is in a position comprising a swim position or a lounge position; and
   e) a backrest frame that connects to the main frame;
wherein the method comprises the steps of:
   a) engaging the drop seat to position the drop seat in a lounge position; and
   b) allowing an individual to lounge in the chair.

* * * * *